United States Patent Office 2,943,915
Patented July 5, 1960

2,943,915
PROCESS FOR PRODUCING POTASSIUM ACID PYROPHOSPHATE

James W. Edwards, Dayton, Ohio, assignor to Monsanto Chemical Company, St. Louis, Mo., a corporation of Delaware No Drawing. Filed June 27, 1957, Ser. No. 668,321

2 Claims. (Cl. 23—106)

This invention relates to an improved process for producing potassium acid pyrophosphate. More specifically, this invention relates to an improved process for producing potassium acid pyrophosphate by condensation of a potassium orthophosphate composition in which the atomic ratio of potassium to phosphorus is approximately unity.

Many acid pyrophosphates, such as sodium acid pyrophosphate and calcium acid pyrophosphate, can be readily prepared by molecular dehydration or condensation of an orthophosphate containing equivalent proportions of metal atoms and phosphorus atoms. For example:

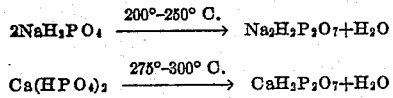

$$2NaH_2PO_4 \xrightarrow{200°-250°\ C.} Na_2H_2P_2O_7 + H_2O$$

$$Ca(HPO_4)_2 \xrightarrow{275°-300°\ C.} CaH_2P_2O_7 + H_2O$$

In the case of potassium salts, however, it has been very difficult, if not impossible, to form the acid pyrophosphate by molecular dehydration of orthophosphates. Past attempts have almost invariably led to formation of the metaphosphate by the reaction:

$$KH_2PO_4 \rightarrow KPO_3 + H_2O$$

It has now been found that potassium acid pyrophosphate can be quite readily prepared by condensation (or molecular dehydration) of an orthophosphate composition containing approximately equal atomic proportions of potassium and phosphorus, if some of the desired crystalline potassium acid pyrophosphate is added to the orthophosphate reaction mixture prior to molecular dehydration thereof. This reaction is best carried out at a temperature between about 200° and about 250° C., and preferably between about 220° and about 240° C.

Typical examples of orthophosphate compositions to which the present technique is applicable can be represented as follows:

(Eq. I)     $2KH_2PO_4 \rightarrow K_2H_2P_2O_7 + H_2O$ (Eq. II)    $2KOH + 2H_3PO_4 \rightarrow K_2H_2P_2O_7 + 3H_2O$ (Eq. III)    $K_2CO_3 + 2H_3PO_4 \rightarrow K_2H_2P_2O_7 + 4H_2O + CO_2$ Since KOH or $K_2CO_3$ will react readily with $H_3PO_4$, even at room temperature, to form potassium orthophosphate salts, Equations II and III probably involve the intermediate formation of monopotassium dihydrogen orthophosphate—and, consequently, are merely special cases of Equation I.

The proportion of crystalline potassium acid pyrophosphate to be added to the orthophosphate reaction mixture can be varied with considerable latitude, depending upon such variables as the particular reactants involved and the reaction temperature, as well as upon the degree of subdivision of the pyrophosphate and the uniformity of distribution thereof throughout the orthophosphate reaction mixture. In general, a minor proportion in excess of one-tenth or one-half of one percent by weight, and preferably in excess of about 2 percent by weight (based upon the total reaction mixture) will be desirable. Much greater concentrations (e.g., as high as 20 percent, or even as high as 50 percent or higher) will often be advantageous.

Further details and information with respect to the practice of the present invention will be apparent from the following example.

Example

A two-gram sample of monopotassium dihydrogen orthophosphate and a two-gram sample consisting of equal parts by weight of monopotassium dihydrogen orthophosphate and potassium acid pyrophosphate were each heated for 75 minutes at 225° C. Subsequent analyses of the products showed that the sample originally containing potassium acid pyrophosphate had been converted to about 86 weight percent potassium acid pyrophosphate, whereas no pyrophosphate was detected in the other sample.

This application is a continuation-in-part of my co-pending application Serial No. 487,221, filed February 9, 1955, now abandoned.

I claim:

1. A method for producing crystalline potassium acid pyrophosphate from an orthophosphate composition containing approximately equal atomic proportions of potassium and phosphorus by molecular dehydration of said orthophosphate composition at an elevated temperature below the melting point of said pyrophosphate, which method comprises adding solid crystalline potassium acid pyrophosphate to said orthophosphate composition prior to molecular dehydration thereof.

2. A method for producing crystalline potassium acid pyrophosphate from monopotassium dihydrogen orthophosphate by molecular dehydration of said orthophosphate at a temperature between about 200° and about 250° C., which method comprises adding solid crystalline potassium acid pyrosphosphate to said orthophosphate prior to molecular dehydration thereof.

References Cited in the file of this patent
UNITED STATES PATENTS 2,737,443    Wright ------------------ Mar. 6, 1956